Aug. 31, 1926.
J. N. COMPTON
1,598,560
PROCESS OF COMBINING ETHYLENE WITH SULPHURIC ACID
Filed May 29, 1923
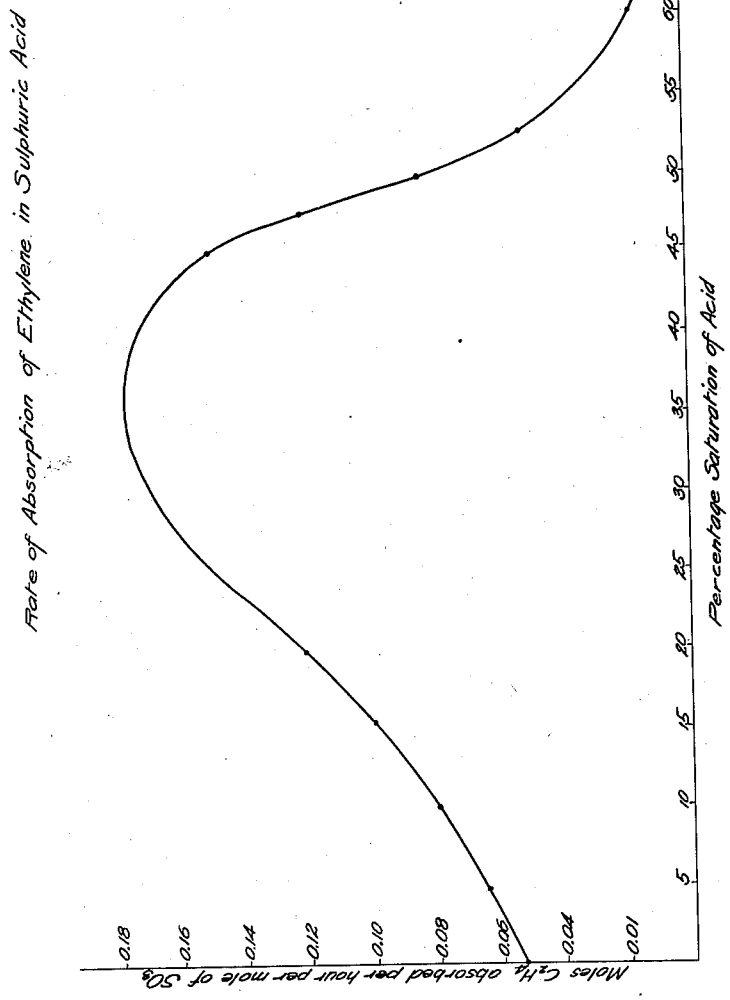
Inventor:
John N. Compton,
By Byrnes Townsend & Brickenstein,
Attorneys.

Patented Aug. 31, 1926.

1,598,560

UNITED STATES PATENT OFFICE.

JOHN N. COMPTON, OF CLENDENIN, WEST VIRGINIA, ASSIGNOR TO CARBIDE & CARBON CHEMICALS CORPORATION, A CORPORATION OF NEW YORK.

PROCESS OF COMBINING ETHYLENE WITH SULPHURIC ACID.

Application filed May 29, 1923. Serial No. 642,315.

Ethylene is absorbed by strong sulphuric acid forming mono- or diethyl sulphates, which are useful for many purposes, for example as alkylating reagents and to be hydrolyzed into ethyl alcohol.

While propylene and other olefin hydrocarbons dissolve quite readily in strong sulphuric acid, ethylene is absorbed comparatively slowly, and when it is diluted by other gases, as is often the case, its absorption is further retarded. If a large quantity of ethylene is to be absorbed, a very large apparatus is required if constructed according to present practice.

I have found that if pure strong sulphuric acid is treated with ethylene under conditions favorable for absorption, the rate of absorption, which is quite low at first, increases as the ethylene is absorbed and reaches a maximum when about 60 to 80 moles of ethylene have been absorbed for each 100 moles of $H_2SO_4$ taken, that is, when the ethylene which has been absorbed is about 60 to 80% of that required to convert all the acid to ethyl-hydrogen sulphate or about 30 to 40% of that which is theoretically necessary to convert all the acid to diethyl sulphate. Beyond this maximum, the rate of absorption falls off rapidly and soon reaches a low and almost constant rate.

The accompanying drawing shows this phenomenon graphically. In the drawing is a curve plotted on coordinate axes, ordinates being the time-rate of ethylene absorption, and abscissæ the composition of the absorbent, in percentage saturation of the acid. The saturation point of the acid referred to is an assumed stage where the absorbent contains two moles of $C_2H_4$ per mole of $SO_3$, and therefore corresponds to diethyl sulphate.

While the particular curve shown applies only to certain specific conditions, including the design of the absorption apparatus, concentrations of acid and ethylene, rate of gas flow, etc., it is typical of the behavior of ethylene and sulphuric acid under a wide variety of conditions. In general, mixtures containing 60 to 80 moles of ethylene per 100 moles of $SO_3$ (in chemical combination as mono- and diethyl sulphate, or as sulphuric acid) are very active absorbents for ethylene. It will be observed upon examination of the curve shown in the drawing that when the ethylene content of the bath falls to as low as 20 moles per 100 moles of acid, or rises to 90 moles per 100 moles of acid, the bath is still a decidedly more active absorbent for ethylene than is pure sulphuric acid.

A number of useful processes can be based on this discovery. In the manufacture of ethyl alcohol by dissolving ethylene in sulphuric acid and then decomposing the resultant product with water, acid containing practically any possible proportion of combined $C_2H_4$ can be used. More than 50% saturation is usually not desired as the diethyl sulphate is not so readily hydrolyzed as the mono-ethyl compound. Low percentages of saturation are uneconomical as the same quantity of acid must be reconcentrated for further use whether the degree of saturation was low or high, while the yield of alcohol is of course higher in the latter case. A percentage of saturation in the product subjected to hydrolysis corresponding to the maximum rate of ethylene absorption, gives economical operation.

A composition of absorbent which gives the most rapid rate of ethylene absorption may therefore be maintained continuously by adding acid and ethylene at appropriate rates to a body of liquid having the most active composition. Liquid may be drawn off at a suitable rate to keep the bulk in the absorber within proper limits. A continuous process favored by a very good rate of ethylene absorption and giving a product suitable for alcohol production is therefore provided.

The discovery referred to can also be utilized to advantage where lower or higher degrees of saturation than that corresponding to the maximum on the curve are desired. Lower concentrations can best be prepared by diluting the product of maximum absorptive activity, prepared as described above, with sulphuric acid. For products of higher saturation than that of maximum absorptive activity, the later stages of the absorption obviously cannot be carried out under the most favorable conditions, but the absorption can begin in a liquid of maximum absorptive activity.

An especially advantageous process, based on my discovery, can be used where a saturation corresponding to the downward slope of the curve is desired, and two ethylene mixtures of different concentrations are available. The absorption from the more dilute mixture can then take place in absorbent of maximum activity in the manner already described, while the enrichment with ethylene beyond this point can be effected with the stronger ethylene mixture, a high ethylene content favoring absorption.

In the above examples, continuous processes have been particularly referred to. Batch processes, using the more favorable ranges of saturation, can of course be used, and many modifications of the invention, designed to meet special conditions, will suggest themselves.

I claim:

1. Process of combining ethylene with sulphuric acid which comprises preparing a bath containing 20 to 90 moles of ethylene per 100 moles of sulphur trioxide; absorbing ethylene in the bath; and holding the composition of the bath within the limits stated by regulated additions of acid.

2. Process of combining ethylene with sulphuric acid which comprises preparing a bath containing 60 to 80 moles of ethylene per 100 moles of sulphur trioxide; absorbing ethylene in the bath; and holding the composition of the bath within the limits stated by regulated additions of acid.

3. Process of combining ethylene with sulphuric acid which comprises preparing a bath containing about 70 moles of ethylene per 100 moles of sulphur trioxide; absorbing ethylene in the bath; and holding the composition of the bath substantially constant by regulated additions of acid.

In testimony whereof I affix my signature.

JOHN N. COMPTON.